Sept. 18, 1945.      S. H. COOK      2,384,799
ELECTRICAL APPARATUS
Filed Dec. 15, 1943      2 Sheets-Sheet 1
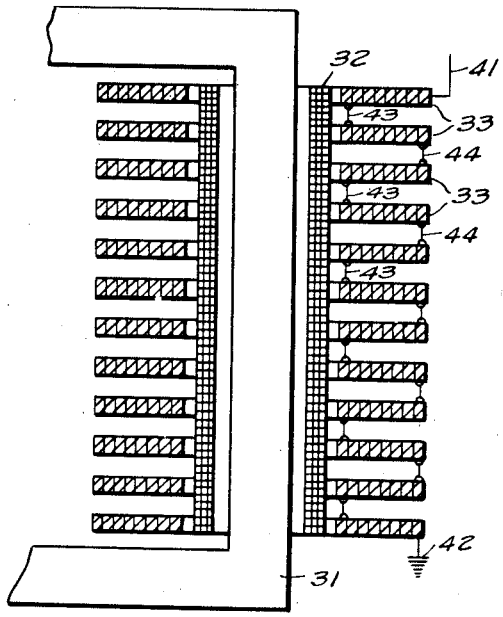
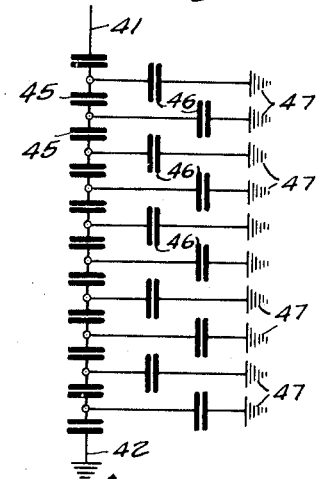
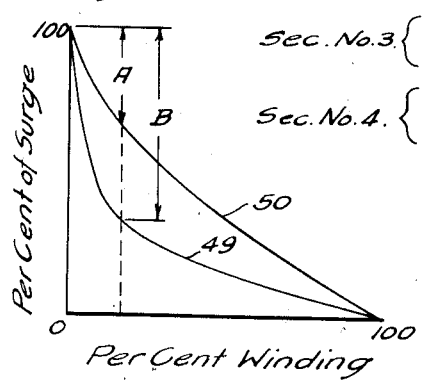
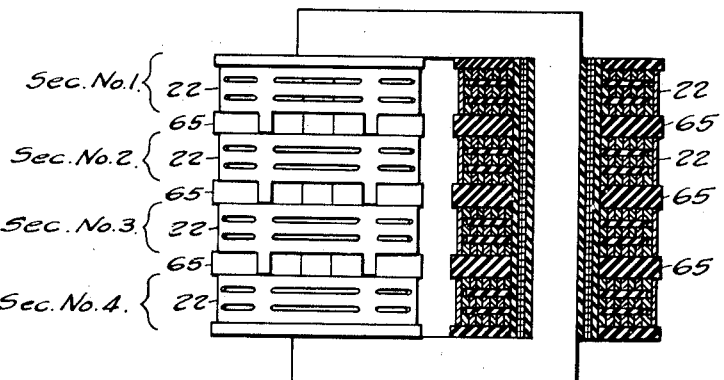
WITNESSES:
INVENTOR
Shirley S. Cook.
BY
Franklin E. Hardy
ATTORNEY Sept. 18, 1945. S. H. COOK 2,384,799
ELECTRICAL APPARATUS
Filed Dec. 15, 1943 2 Sheets-Sheet 2
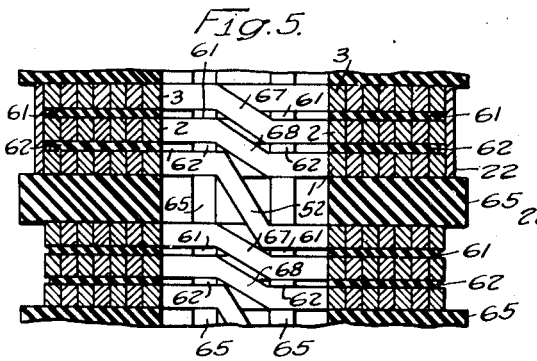
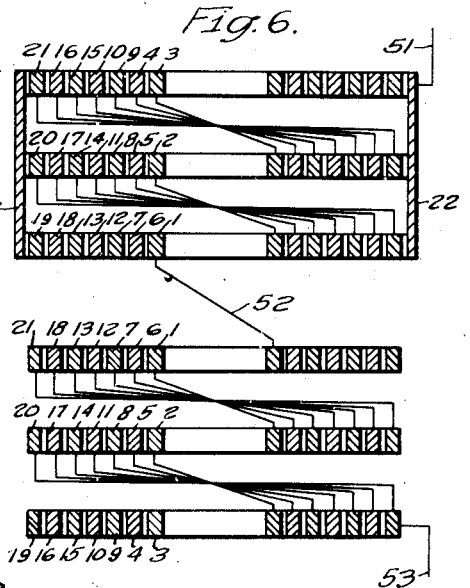
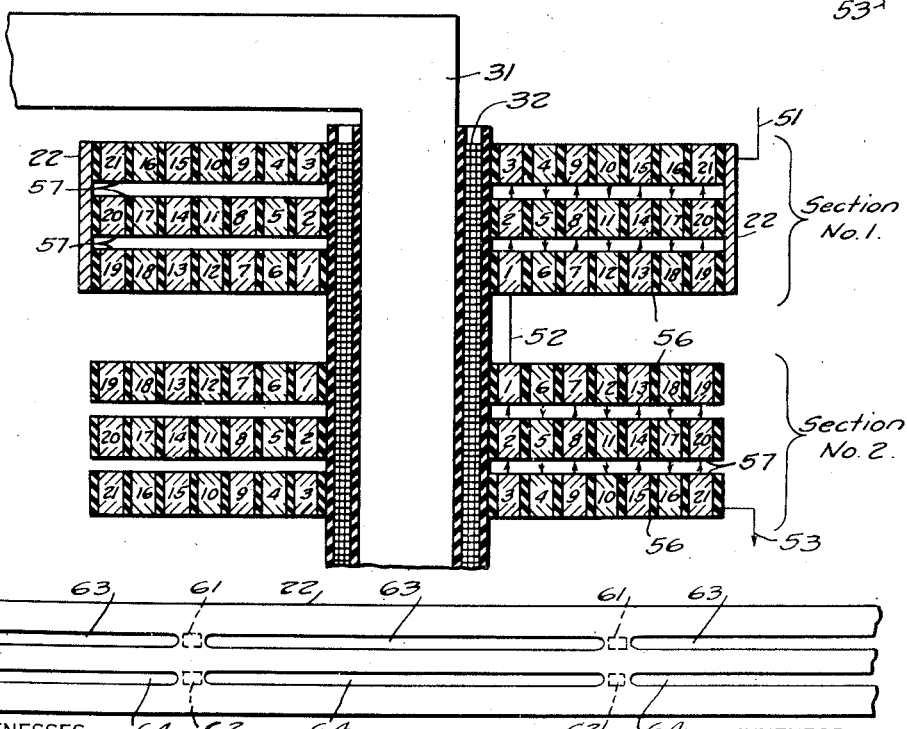
WITNESSES:
E. A. M'Closkey.
Nm. C. Groome
INVENTOR
Shirley S. Cook.
BY
Franklin E. Hardy
ATTORNEY Patented Sept. 18, 1945

2,384,799

UNITED STATES PATENT OFFICE 2,384,799

ELECTRICAL APPARATUS

Shirley S. Cook, Sharon, Pa., assignor to Westinghouse Electric Corporation, East Pittsburgh, Pa., a corporation of Pennsylvania Application December 15, 1943, Serial No. 514,386

8 Claims. (Cl. 175—356)

My invention relates to means for improving the electrostatic distribution of surge voltages in the windings of electrical apparatus.

In the windings of electrical apparatus, such as transformers that are connected to a transmission line, the voltage between the terminals of a winding varies uniformly from one end of the winding to the other under normal frequency and voltage conditions of the system. However, during certain conditions of the system such as may be caused by lightning on the transmission line, a high voltage surge may occur and enter the winding of the transformer.

In windings of the usual construction a voltage surge will not immediately distribute itself along the winding in a manner to establish a uniform voltage gradient, but its initial distribution produces a high concentration of voltage stress on the parts of the winding nearest to the line terminal. When a voltage is suddenly impressed across the terminals of the winding, an instantaneous distribution of the voltage through the winding is effected through the medium of its capacitance.

The capacitance of the winding consists of the entire series and parallel capacity elements existing throughout the winding from one terminal to the other including the capacity from the winding to ground and capacity from one part of the winding to another. The charging of the various capacity elements to the respective potentials corresponding to the initial voltage distribution along the winding is effected by the flow of current between capacity elements which does not flow along the winding conductor through its inductance but only through other series capacitances.

If the initial voltage distribution thus produced throughout the winding is not a uniform voltage gradient, subsequent and more gradual changes take place in an effort to establish a uniform distribution. These changes are effected by currents flowing along the winding transferring charges from one capacity element to another through the inductance of the winding. As is well known, such flow of current between capacity elements through inductance results in oscillations, the current surging back and forth with alternating voltage values above and below the values corresponding to a uniform voltage gradient. The amplitude of the oscillations will initially correspond to the difference between the initial voltage distribution and the final voltage distribution along the uniform gradient. These oscillations create succesisve voltage stresses between adjacent parts of the winding and between the winding and ground. This dangerous initial voltage distribution and the oscillations resulting therefrom will not occur, however, if the initial voltage distributions, due to capacitance, is uniform with respect to the turns of the winding, that is, if the capacitance associated with the inductance of any winding be disposed in such manner that the potential gradient which would be produced by the capacitance alone is the same as that which would be produced by the inductance alone. The initial voltage stresses and the oscillations resulting from the initial voltage distribution will be greatly reduced if the coil-to-coil capacities are increased so that the potential gradient produced by the capacity alone is more nearly that which would be produced by the inductance alone.

The problem of insulating the conductors and coils of a transformer winding to withstand the surge voltages impressed upon them is a difficult one because in the usual construction of these parts the conductors are so small that satisfactory means of applying sufficient insulation to withstand the voltage stresses are not really available. If sufficient insulating material is applied about the conductors, the space factor between the conductors will become so large as to effect the efficiency of the design. It is, therefore, desirable to provide for lessening the voltage stresses between the several parts of the winding that are caused by the concentration of surge voltages in order to produce a more effective and efficient structure.

This concentration of surge voltage is particularly likely to occur in the case of core type transformers in which stacks of a relatively large number of individual coils are employed, the separate coils being relatively narrow so that the capacity between coils is small as compared to the capacity between the separate coils and ground. The resulting poor voltage distribution results in high voltage stresses between the coils of the winding, particularly those adjacent the end of the winding and, therefore, requires large distances between the coils in order to provide the necessary insulating strength.

It is an object of the invention to provide an arrangement of the turns of the winding of electrical apparatus for improving the distribution of surge voltages throughout the winding.

It is a more specific object of the invention to provide an arrangement of the turns of the winding of an electrical apparatus in a plurality of sections, each section comprising a plurality of disk-type coil layer structures spaced apart, and through which the several winding turns continue successively through the separate coil layer structures and in which the outer turn of at least the first of the winding sections extends about the edges of the several disk-coil layer structures of that section.

Other objects and advantages of the invention will be apparent from the following description of a preferred embodiment of the invention, reference being had to the accompanying drawings, in which:

Figure 1 is a sectional view through a portion of a conventional winding structure;

Fig. 2 is a diagram of the capacity network of the high voltage winding of Fig. 1;

Fig. 3 is a diagram illustrating curves showing the initial surge voltage distribution in a high voltage winding of the character shown in Fig. 1 and in a winding constructed in accordance with the invention;

Fig. 4 is an elevational view partly in section showing an arrangement of the winding turns in accordance with the invention;

Fig. 5 is a vertical sectional view illustrating the crossover connections of the conductor between different coil layer levels of the winding;

Fig. 6 is a diagram of the connection of a conductor through two sections of the winding constructed in accordance with the invention;

Fig. 7 is an enlarged sectional view of a portion of a transformer core and coil assembly employing such winding sections; and Fig. 8 is a side elevational view of a conductor comprising the outer turn of the winding section.

In the drawings, Fig. 1 shows a portion of a conventional transformer structure having a winding core 31 of magnetic material about which is positioned a cylindrical low-voltage winding 32 and a high-voltage winding made up of a stack of disk-type coils 33. The winding is connected between a high-voltage terminal conductor 41 at the upper end of the stack of coils and ground at 42 at the lower end of the stack of coils. The coils are shown connected in "start-start, finish-finish" connection, the conductors 43 connecting the "start" ends of the alternate coils together and the conductors 44 connecting the "finish" ends of the alternate coils together.

The capacity network shown in Fig. 2 corresponds approximately to the arrangement of the capacities between various parts of the winding and the adjacent parts and between the winding parts and ground, the condenser elements 45 connected in series between the terminals 41 and 42 of the winding corresponding substantially to the capacitance between coils of the winding and the condenser elements 46 connected between distributed points of the series chain of condenser elements 45 and ground corresponding to the capacitance between these parts of the winding and the metal case or core structure which is at ground potential as shown at 47.

If a voltage surge is suddenly applied to the terminals of the winding in Fig. 1, the initial voltage distribution along this winding will be of the order shown in the curve 49 in Fig. 3, in which, it will be noted, a large part of the initial voltage "B" is impressed across a very small fraction of the winding. For example, about two-thirds of the initial voltage that is impressed across the whole stack appears across the first two coil layers, so that it will be necessary to provide sufficient insulation between these coils to withstand this large proportion of the total voltage applied to the winding.

In accordance with my invention, and as best shown in Figs. 4, 5, 6 and 7, the winding is divided into a number of sections of a number of coil layers each. For the purpose of convenience in illustrating the principle of the invention, four sections of three coil layers each are shown in Fig. 4, it being understood that in a core type transformer a stack of coil layers of several times this number might be employed and that the whole stack might be connected in accordance with the principles of the invention, or, if desired, the portion only of the whole winding nearest the high voltage terminal conductor where the voltage gradient is the steepest, as indicated in Fig. 3, may be so connected. The voltage gradient throughout the remainder of the winding will be greatly improved by the use of the wide ribbon-like outer turn about the coil layers comprising the line connected end section of the winding, which will result in changing the curve of voltage distribution throughout the winding from something of the order shown in curve 49 of Fig. 3 to the order shown on curve 50 of Fig. 3. In Fig. 4 the wide ribbon-like end turn 22 is shown about each of the several groups of coil layers comprising the several sections of the winding. Since, however, it would rarely be necessary in practice to use the wide turn except about the coil layers of the end section, where the surge voltage gradient is steepest, the wide end turn 22 is shown only on the end section of the winding in Figs. 5, 6 and 7. Where both ends of the winding are connected to a line circuit conductor, as in the case of a delta connected three phase winding, or a single phase winding in which both ends of the winding are connected to the line, both end sections of the winding should be provided with the wide outer turn.

In Figs. 5, 6 and 7 of the drawings, two winding sections only are shown each having three coil layers. Referring particularly to Fig. 7, the numbers shown within the cross section of the conductors represent the number of the turn of that conductor in its section. For example, in section 1 comprising the three coil layers at the top of the winding, the first conductor turn is positioned at the bottom of the three layers along the inner edge of this layer. The second conductor turn is in the middle layer directly above the first turn and the third turn is in the top layer directly above the second turn. These three turns in the three coil layers, respectively, have the same diameter about the axis of the winding. The next three turns, 4, 5 and 6, of the same winding section likewise have the same diameter as each other and are positioned in the top, middle, and bottom layers about turns 3, 2 and 1, respectively. The conductor is so wound as to repeat this sequence, the turns 7, 8 and 9 being progressively one above the other and of like diameter as each other, and the turns 10, 11 and 12 being progressively one below the other and of the same diameter as each other, each set of three conductors having a larger diameter than the previous set of three in the series. This sequence continues through winding turns 19, 20 and 21. The last wound turn 22 of the section No. 1 extends about the outer edges of all three coil layers of the section, this turn being in the form of a ribbon having a vertical dimension extending from the upper edge of the top layer of the section to the bottom edge of the layer of the section.

The wide outer turn 22 of winding section No. 1 is connected to the high-voltage line conductor 51 and the inner turn No. 1 of section 1 is connected to a similar inner turn No. 1 in section No. 2 of the winding through a conductor 52, the last turn 21 in the series of turns within section No. 2 being connected by conductor 53 to the next lower section of the winding. In the second section of the winding marked section No. 2 in Fig. 7, the several turns of the conductor are wound in a manner similar to that of section No. 1 except that the vertical order of the turns is reversed, turn No. 1 being at the top instead of bottom of the section and the group of three turns 1, 2 and 3 progressing downwardly instead of upwardly through the three coils layers of the section, the second three turns 4, 5 and 6 progressing upwardly in section No. 2 instead of downwardly as in section No. 1, the last turn 22 of the section extending about all three layers in the same manner as in section No. 1.

The winding terminal 51 is connected to the outer turn 22 of section 21 and the conductor continues progressively from turn 22 to turn 1 of section No. 1 and then from turn No. 1 of section 1 through conductor 52 to turn No. 1 of section 2 and progressively from turn No. 1 to turn No. 21 of section 2 and through conductor 53 to the next lower section, the cycle of turns in the next two sections being a duplicate of those in sections Nos. 1 and 2 and this duplication being repeated as often as is found desirable through as many pairs of sections of the winding as desirable. As indicated above, the ribbon-like winding turn 22 would not be required on the several sections of the winding other than the section connected to the high voltage line conductor where the voltage surge wave is very steep.

It will be noted that in this arrangement of the turns of the winding, a substantial space 56 for insulating purposes is provided between each of the several sections since the terminal turns 22 have a difference in potential corresponding to the potential across the two sections of the winding in series. It will also be noted that the spaces 57 between the several coil layers of a section may be small, only enough space being provided for the flow of cooling oil since the voltage stresses between different parts of the adjacent current coil layers correspond only to the voltage between turns that are nearly adjacent in the series of turns comprising the winding, as, for example, between turns 2 and 3, turns 4 and 5, turns 8 and 9, etc. This results in reducing the space required along the length of the column or stack of coil sections for insulating the turns of the winding and the arrangement of the individual turns within the section causes the capacity between winding sections to be much larger than the capacity between the equally spaced coils of a winding of the character shown in Fig. 1. Therefore, in a capacity network of the character shown in Fig. 2, the series capacities between winding sections or coils in a construction corresponding to that shown in Figs. 4 to 7 are very much larger than where the several turns of the winding progress sequentially throughout one coil layer, as in the conventional type of winding shown in Fig. 1.

Referring to Fig. 5, the separate coil layers are spaced apart by means of radially extending spacer elements of insulating material such as 61 and 62 which may be in the form of rectangular bars of insulating material extending radially between the several coil layers in a well-known manner. The outer ends of these rectangular bars 61 and 62 will terminate at the inner edge of the last turn 22 of the section as indicated in dotted lines in Fig. 8. As shown in Fig. 8 and also in Fig. 4, the outer turn 22 of the section is provided with openings 63 and 64 positioned at an elevation corresponding to the spaces 57 between the coil layers so as to permit circulation of oil between the coil layers of the section and the area surrounding the section. Similar rectangular bars of insulating material 65 are provided between the sections of the winding, these being in general similar to the insulating bars 61 and 62 except that they have a greater vertical depth to correspondingly space the winding sections a greater distance from each other than the coil layers within a section are spaced. The members 65 also extend outwardly beyond the outer surface of the turns 22 of the winding sections so as to space these turns as well as the remaining parts of the sections. In Fig. 5, the crossover connections between turn 3 and turn 2 of the upper section is shown at 67 and the crossover connection between turn 2 and turn 1 is shown at 68 and the crossover connections between the two sections is shown at 52, the corresponding crossovers being repeated at 67 and 68 in the lower of the two sections shown in Fig. 5.

In Fig. 6, the sequence of turns are shown in diagrammatical form, it being appreciated that the connections between the turns shown are for the purpose of illustrating the circuit which may be a single continuous conductor wound with the several turns in the positions indicated or each section may be wound separately and the conductor connections between circuits being completed during the assembly of the sections into the completed transformer winding structure.

It will be noted by reference to Fig. 3 of the drawings that the voltage A across the indicated portion of the winding constructed in accordance with the invention is about one-half of the voltage B across a corresponding portion of the conventional winding of Fig. 1. The actual shape of the curve 50 may change with different spacing of the coil layers and sections and will depend upon the desired degree of approach of the initial voltage distribution along the winding to a straight line gradient.

The values A and B of Fig. 3 are not, of course, intended to represent precise values, but to illustrate the order of improvement resulting from the use of the disclosed invention.

It will be apparent to one skilled in the art that modifications in the arrangement of parts may be made within the spirit of my invention, and I do not wish to be limited otherwise than by the scope of the appended claims.

I claim as my invention:

1. Electrical apparatus comprising inductively related low-voltage and high-voltage windings disposed about the winding leg of a core structure, the high-voltage winding comprising a continuous winding conductor including a plurality of coil sections arranged in a stack, each section including a plurality of disk-type coil layer structures spaced apart, the line end turn of the winding being formed of a ribbon-like conductor having one dimension corresponding to the thickness of the section and extending simultaneously about the edges of all of the several coil layer structures of the first section of the winding, the conductor continuing through a series of turns in individual coil layers of the section, the turn next within the outer line end turn being in the coil layer at the end of the stack of coils comprising the winding and continuing in successive turns through corresponding positions with respect to the distance from the axis in the several coils of the section, the conductor continuing through a plurality of winding sections in a series of turns including in sequence in each section one turn in each coil layer of the section having similar positions with respect to the axis.

2. In electrical apparatus, a winding comprising a continuous winding conductor arranged in a plurality of coil sections having the same inner and outer diameters, each section including a plurality of flat disk-type coil layers spaced apart along a common axis, the line end turn of the winding being formed of a ribbon-like conductor having one dimension corresponding to the thickness of the section and extending simultaneously about the edges of all of the several coil layer structures of the first section of the winding, the conductor continuing through a series of turns in individual coil layers of the section, the turn next within the outer line end turn being in the coil layer that is at the end of the stack of coils comprising the winding and continuing in series in sequence through the several turns in the separate coil layers of the section that occupy the same position with respect to the axis of the coils so as to alternate from one end of the section to the other in turns of gradually changing diameters.

3. In electrical apparatus, a winding comprising a continuous winding conductor arranged in a plurality of coil sections each section including a plurality of flat disk-type coil layers spaced apart in a stack along a common axis, the end turn of the winding being formed of a ribbon-like conductor having one dimension corresponding to the thickness of the section and extending simultaneously about the edges of all of the several coil layer structures of the first section of the winding, the conductor continuing in sequence through a series of groups of turns, each group including turns in each coil layer that occupy the same position with respect to the axis of the coils, the turns of the separate groups occupying different positions with respect to the axis of the coils than the turns of the other groups so as to alternate from one end of the section of the other in turns of gradually changing diameters, the winding conductor continuing through a similar series of turns in the second section in the reverse order of the positions of the turns of the first section both with respect to the order of the positions between the separate coil layers of the section and the order of the positions between the inner and the outer turns thereof.

4. In electrical apparatus, a winding comprising a continuous winding conductor arranged in a plurality of coil sections each section including a plurality of flat disk-type coil layers spaced apart in a stack along a common axis, the end turn of the winding being formed of a ribbon-like conductor having one dimension corresponding to the thickness of the section and extending simultaneously about the edges of all of the several coil layer structures of the first section of the winding, the conductor continuing in sequence through a series of turns in individual coil layers of the section, the turn next within the outer line turn being in the coil layer that is at the end of the stack of coils comprising the winding and continuing in series in sequence through the several turns in the separate coil layers of the section that occupy the same position with respect to the axis of the coils so as to alternate from one end of the section to the other in turns of gradually changing diameters, the winding conductor continuing through the turns of the second section in the reverse order of the positions of the turns of the first section between the separate coil layers of the section and between the inner and the outer turns thereof, so that the terminals of the first two winding sections in series are adjacent each other across the space between the sections.

5. Electrical apparatus comprising inductively related low-voltage and high-voltage windings disposed about the winding leg of a core structure, the high-voltage winding comprising a continuous winding conductor including a plurality of coil sections arranged in a stack, each section including a plurality of disk-type coil layer structures spaced apart, the line end turn of the winding being formed of a ribbon-like conductor having one dimension corresponding to the thickness of the section and extending simultaneously about the edges of all of the several coil layer structures of the first section of the winding, the ribbon-like end turn having a plurality of openings therethrough at elevations corresponding to the spaces between the coil layers to permit the free flow of insulating fluid through the openings therein between spaces between the coil layers and the space surrounding the coil section, the conductor continuing in successive groups of turns, the turns of each group including a turn in each coil layer occupying corresponding positions with respect to the distance from the axis in the several coils of the section, the conductor continuing through a plurality of winding sections in a series of turns including in sequence in each section a group of turns including one turn in each coil layer of the section having similar positions with respect to the axis.

6. In electrical apparatus, a winding comprising a continuous winding conductor arranged in a plurality of coil sections having the same inner and outer diameters, each section including a plurality of flat disk-type coil layers spaced apart along a common axis, the line end turn of the winding being formed of a ribbon-like conductor having one dimension corresponding to the thickness of the section and extending simultaneously about the edges of all of the several coil layer structures of the first section of the winding, the ribbon-like end turn having a plurality of openings therethrough at elevations corresponding to the spaces between the coil layers to permit the free flow of insulating fluid through the openings therein from the spaces between the coil layers and the space surrounding the winding section, the conductor continuing through successive groups of turns, the several turns in each group including turns in each of the separate coil layers of the section that occupy the same position with respect to the axis of the coils, the turns of the separate groups occupying different positions with respect to the axis of the winding than do the turns of the other groups so as to alternate from one end of the section to the other in turns of gradually changing diameters, and radial spacers between the several coil layers of the section for spacing the coil layers, the outer ends of the radial spacers terminating adjacent the inner side of the ribbon-like turn.

7. In electrical apparatus, a winding comprising a continuous winding conductor arranged in a plurality of coil sections each section including a plurality of flat disk-type coil layers spaced apart in a stack along a common axis, the end turn winding being formed of a ribbon-like conductor having one dimension corresponding to the thickness of the section and extending simultaneously about the edges of all of the several coil layer structures of the first section of the winding, the ribbon-like end turn of the winding having a plurality of openings therethrough at elevations corresponding to the spaces between the coil layers to permit the flow of insulating fluid through the openings therein between the spaces between the coil layers and the space surrounding the coil section, the conductor continuing in series in sequence through the several turns in the separate coil layers of the section that occupy the same position with respect to the axis of the coils so as to alternate from one end of the section to the other in turns of gradually changing diameters, the winding conductor continuing through the turns of the second section in the reverse order of the positions of the turns of the first section between the separate coil layers of the section and between the inner and outer turns thereof.

8. In electrical apparatus, a winding comprising a continuous winding conductor arranged in a plurality of coil sections each section including a plurality of flat disk-like coil layers spaced apart in a stack along a common axis, the end turn of the winding being formed of a ribbon-like conductor having one dimension corresponding to the thickness of the section and extending simultaneously about the edges of all of the several coil layer structures of the first section of the winding, the ribbon-like end turn of the winding having a plurality of openings therethrough at elevations corresponding to the spaces between the coil layers to permit the flow of insulating fluid through the openings therein between the spaces between the coil layers and the spaces surrounding the coil section, the conductor continuing in series in sequence through the several turns in the separate coil layers of the section that occupy the same position with respect to the axis of the coils so as to alternate from one end of the section to the other in turns of gradually changing diameters, the winding conductor continuing through the turns of the second section in the reverse order of the positions of the turns of the first section between the separate coil layers of the section and between the inner and the outer turns thereof so that the terminals of the first two winding sections that are directly connected in series are adjacent each other across the space between the sections.

SHIRLEY S. COOK.